Dec. 17, 1946.   L. O. BUXTON   2,412,766
PROCESS OF PRODUCING VITAMIN CONCENTRATES
Filed July 13, 1942
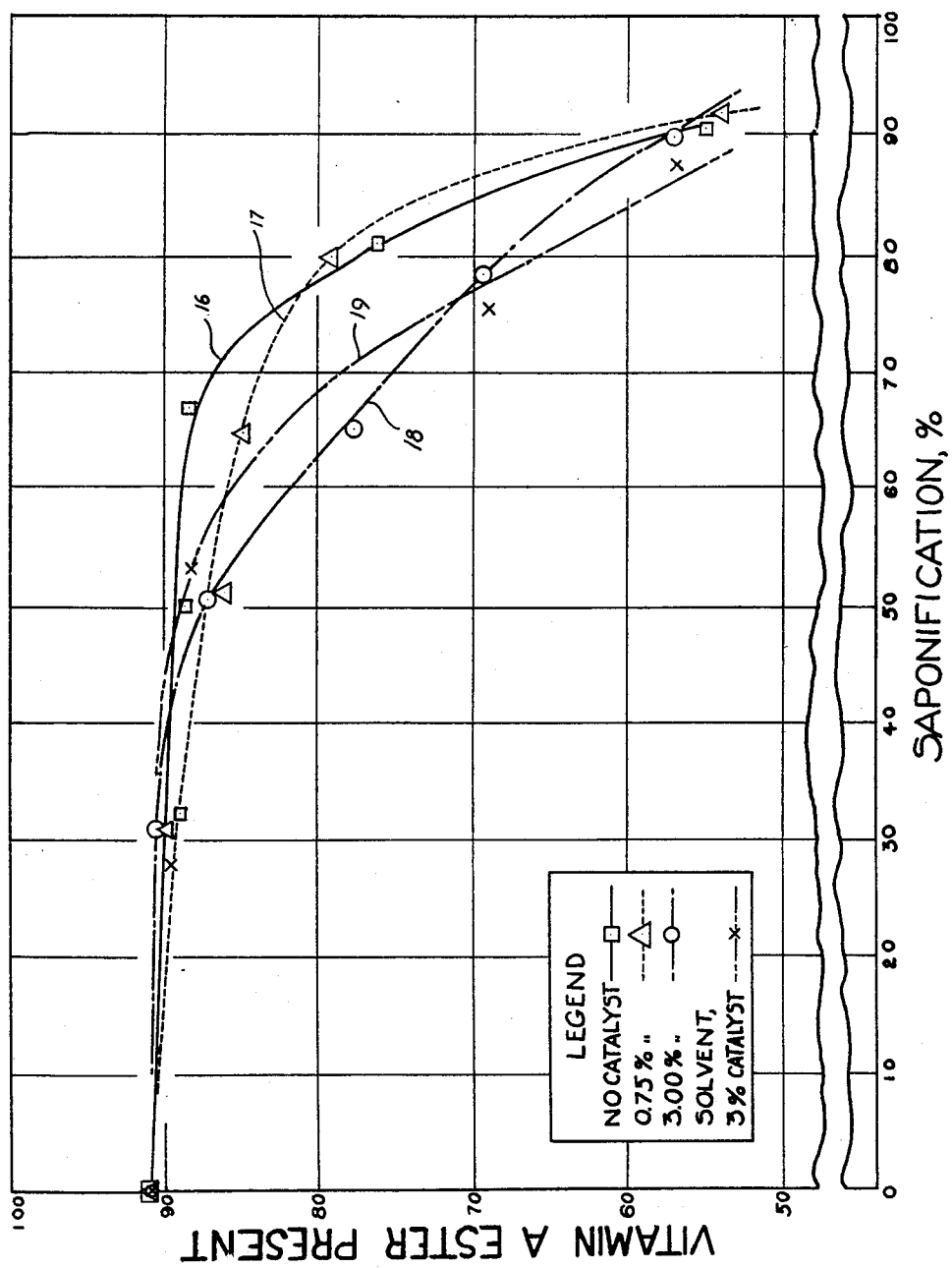
INVENTOR
Loran O Buxton
BY
Harold A Swanson
ATTORNEY Patented Dec. 17, 1946

2,412,766

UNITED STATES PATENT OFFICE 2,412,766

PROCESS OF PRODUCING VITAMIN CONCENTRATES

Loran O. Buxton, Newark, N. J., assignor to National Oil Products Company, Harrison, N. J., a corporation of New Jersey Application July 13, 1942, Serial No. 450,757

6 Claims. (Cl. 167—81)

This invention relates to the production of concentrates of fat-soluble vitamins from natural oils and fats containing the same, and particularly to the production of such concentrates in which the vitamins are in the ester form.

The natural vitamin-bearing oils are complex mixtures containing free fatty acids; fatty acid glycerides; fatty acid esters of vitamins A and D, vitamin A and D in alcoholic form and other higher alcohols including sterols and ether alcohols; and other unsaponifiable matter such as hydrocarbons, etc. Vitamin concentrates are commonly prepared from these oils by subjecting them to complete saponification, whereby the free fatty acids are converted to soaps, the glycerides are converted to soaps and glycerine, and the vitamin and other higher alcohol esters are converted to soaps, vitamin alcohols and other higher alcohols. The saponified mass is then extracted with a suitable solvent which dissolves the vitamin alcohols, the other higher alcohols and the other unsaponifiable matter, leaving behind the soaps and glycerine. The solvent is evaporated off from the extract to yield a highly potent vitamin concentrate. It will be noted that in such processes the natural vitamin esters are converted into their less desirable alcoholic form. Further, the action of the saponifying agent develops a characteristic bitter "concentrate" taste which is very difficult to remove by subsequent treatment.

Vitamin concentrates are also prepared by contacting the natural vitamin oils with polar solvents, which preferentially extract the vitamin esters and alcohols from the oil, leaving behind a considerable portion of the inert materials. Such processes, being physical, have the advantage that the vitamin esters are extracted as such from the oil. However, such processes have certain limitations, among which are those due to the dilute state of the vitamins in most raw oils. As a consequence large quantities of oil must be handled; the oil retains a relatively large portion of the vitamins; the solvent extracts considerable inert material; and the end product is relatively low in yield and concentration. Another difficulty is the tendency of stearins and similar components of the oil to entrain the extracting solvent and render separation difficult. Further, these components, having relatively high melting points, cause the products containing them to cloud and thicken in the cold. In general, these components (saturated and slightly unsaturated triglycerides) are characterized by low iodine value and high saponification value, and will hereinafter be termed "saturated glycerides."

Fat soluble vitamin concentrates are also prepared by high vacuum distillation of fish liver oils. This process is endowed with many disadvantages in that the undesirable odor and taste bodies go over into the distillate (the concentrate) and loss of potency is encountered due to polymerization of the vitamins caused by the heat necessarily applied during distillation. Moreover, the process is costly due to the equipment needed and the efficiency of the process as a whole is commercially unsatisfactory.

Accordingly, it is an object of this invention to prepare highly potent concentrates of the fat-soluble vitamins, and particularly to prepare such concentrates in which the vitamins will be in the esterified form.

Another object is to provide highly potent concentrates of fat-soluble vitamins which do not have the characteristic "concentrate" taste.

A further object is to avoid the manipulative difficulties incident to earlier processes.

A still further object is to minimize the conversion of vitamin esters to alcohols in saponification processes.

The objects above set forth are achieved by this invention in a process which involves partially and selectively saponifying a fat-soluble vitamin-bearing marine oil under conditions such as to saponify a major portion of the saturated glycerides, a somewhat lesser portion of the unsaturated glycerides and a still smaller portion of the vitamin esters; thereafter extracting the partially saponified mass with a non-polar solvent to recover an extract containing the unsaponified unsaturated glycerides, vitamin esters, vitamin alcohols (either naturally-occurring or those split during the saponification step) and other unsaponified and unsaponifiable matter, leaving behind the glycerine and the soaps of fatty radicals split off from those components which yielded to the saponification reaction; and evaporating off the solvent to leave a vitamin product which has been to a large degree concentrated and purified by the almost complete removal of the saturated glycerides and the considerable removal of the other fatty constituents. This step product will hereinafter be termed a "semi-concentrate." This semi-concentrate is then further concentrated or fractionated by any suitable process such as high vacuum distillation, adsorption or, preferably, selective fractionation of the vitamins by means of polar solvents.

Contrary to the general belief I have found that in partially saponifying a fish or fish liver oil the saturated and slightly unsaturated glycerides are selectively saponified i. e. the saturated and slightly unsaturated glycerides take precedence over unsaturated glycerides in order of reactions with alkali or alkaline agents. This result may be due to the fact that in marine oils the unsaturated glycerides have higher molecular weights than the more saturated glycerides present therein.

As raw materials in the above briefly outlined process there may be used any of the numerous marine oils containing fat-soluble vitamins, especially the fish liver oils such as cod liver oil, ling cod liver oil, pollack liver oil, tuna liver oil, shark liver oil, dogfish liver oil, mackerel liver oil, swordfish liver oil, spearfish liver oil, sole liver oil and halibut liver oil; and the marine oils such as sardine oil, pilchard oil, herring oil, seal oil and whale oil. Solvent extracts, such as the isopropanol extracts, of the foregoing and similar oils may also be used.

With reference to the partial selective saponification step, this is carried out by treating a vitamin-containing oil with caustic in the manner usual in preparing vitamin concentrates, with the exception that the amount of caustic used is insufficient to completely saponify the oil. It has been discovered by this invention that under these conditions a substantial proportion of the vitamin esters remains intact and that the saturated glycerides are substantially completely saponified along with a portion of the unsaturated glycerides. The partially saponified mass contains vitamin alcohols, both those occurring naturally in the oil and those resulting from saponification of a small amount of the vitamin esters, together with a preponderant amount of the unattacked, naturally occurring vitamin esters; a part of the unsaturated glycerides present in the original oil, unsaponifiable matter, glycerine, soaps derived from the saturated glycerides and soap derived from that portion of the unsaturated glycerides which yielded to the saponification.

This selective saponification can be obtained in some measure with any degree of saponification of the oil up to that approximating complete saponification i. e. 98%. In general, the amount of caustic employed and the consequent degree of saponification will be adjusted according to the products desired, larger amounts of caustic increasing the potency of the products while reducing the net yield of the esterified forms of the vitamins. In usual practise, sufficient caustic will be employed to saponify from about 60% to about 95% of the saponifiable matter in the oil. As just stated, this preferential selective saponification occurs in substantially all cases where a vitamin oil is saponified with a lesser amount of caustic than the amount theoretically required to completely saponify the oil. It has been discovered further, however, that by this invention the selectivity can be enhanced by carrying out the saponification under conditions such that the action of the caustic is retarded. For instance, this retarded preferential saponification can be obtained by diluting the oil with a suitable inert solvent, such as a non-polar solvent on the order of ethylene dichloride, heptane, trichlorethylene hexane, cyclohexane, methyl cyclohexane, or a mixture of two or more of these or like solvents. Based on the weight of oil treated, the weight of solvent employed should range from about 15% to about 99%, and preferably from about 25% to about 75% to obtain the most efficient selective saponification. The retarded preferential saponification can also be brought about by reducing or eliminating the catalyst employed in the saponification reaction. In the saponification of vitamin containing oils, it is the usual practise to add about 2% to 5% of isopropanol or other polar catalyst to allow the saponification to proceed at low temperatures. The use of a lesser quantity of catalyst, for instance between about ½ and 1%, will, when less than the stoichiometric amount of caustic is used, bring about a highly selective preferential saponification. Similarly, the use of a less concentrated caustic will bring about the same general result. Obviously, all three factors—solvent concentration, catalyst concentration, and caustic concentration—may be concurrently adjusted so as to bring about a retarded preferential saponification of the oil. It is to be understood that it is not necessary to carry out the partial saponification step in the presence of either a catalyst or solvent medium.

The step of extracting the semi-concentrate from the selectively partially saponified mass may be carried out by the use of non-polar solvents in a manner paralleling the usual saponification and extraction procedures. In cases where a solvent is used to retard the partial saponification reaction, it is preferable to use the same solvent in the extraction step to simplify recovery of the solvent. After the extract-solvent solution has been separated from the saponified mass the solvent is removed from the solution thus leaving the so-called "semi-concentrate." The "semi-concentrate" which is substantially free of saturated glycerides, is composed essentially of vitamin A and D esters, vitamin A and D alcohols, sterols and the glycerides which escaped saponification.

Due to the mild character of the saponification step, the semi-concentrate is substantially free of the usual characteristic bitter "concentrate" taste normally associated with vitamin concentrates prepared by the heretofore known saponification processes.

The next step in the process of the invention involves subjecting the semi-concentrate to a fractionation procedure which is preferably accomplished by selective extraction of the vitamin alcohols from the vitamin esters by means of polar solvents. As mentioned hereinbefore this semi-concentrate can be conveniently fractionated by processes other than selective solvent extraction, namely, high vacuum distillation, adsorption, etc. The semi-concentrate has been found to be in a particularly favorable condition for such treatments due to its substantial freedom from saturated glycerides. The fractionation by selective extraction with polar solvents may be carried out in one of several alternative ways; first, the semi-concentrate may be contacted and extracted with a highly polar solvent like methanol, which will extract principally the alcoholic vitamins, leaving behind the esterified vitamins in the semi-concentrate; or second, the semi-concentrate may be contacted and extracted with a solvent of lesser polarity, such as isopropanol, which will extract out both the alcoholic and esterified forms of the vitamins to provide a concentrate having a potency higher than that of the semi-concentrate; or third, the alcoholic vitamin may be extracted from the semi-concentrate by means of a highly polar solvent like methanol and thereafter a highly potent vitamin ester concentrate produced by extracting the residual semi-concentrate with a moderately polar solvent like isopropanol; or fourth, both the alcoholic and esterified forms of the vitamins may be extracted from the semi-concentrate by means of a moderately polar solvent such as isopropanol, and the resultant extract separated into ester and alcohol concentrates by fractionation with a very highly polar solvent such as methanol.

Reference has been made above to the fractionation of a fat-soluble vitamin concentrate to separate the vitamin alcohols from the vitamin esters. The preferred solvents employed in this step are methanol and ethanol, however, any other solvent which is characterized by being miscible (a solvent for) with vitamin alcohols but immiscible (a non-solvent for) with vitamin esters may be employed in lieu of or in combination with methanol or ethanol. Such solvents include, among others, isopropanol, isobutanol, n-butanol, acetone and diacetone alcohol each of which has been modified by the addition of at least 9% water, methanol and/or ethanol. In those cases where the vitamin potency of the semi-concentrate containing both vitamin alcohols and esters or the residual portion remaining after the removal of vitamin alcohols therefrom is to be increased a solvent such as isopropanol is preferably used, however, any suitable organic aliphatic polar solvent characterized by being miscible with the semi-concentrate or the aforesaid residual portion thereof at temperatures above room temperature and at least partially immiscible therewith at temperatures below room temperature may be used. Such solvents include, inter alia, acetone, diacetone alcohol and n-butanol. For the purposes of this disclosure room temperature is assumed to be 20° C.

In carrying out the partial saponification step by means of an alkaline agent it is preferred to employ potassium hydroxide, it being understood, however, that any suitable alkaline agent may be used in lieu of KOH such as sodium hydroxide, sodium carbonate, potassium carbonate, etc.

Vitamin concentrates prepared as outlined above are all highly potent, the vitamin ester concentrates in particular being more potent than any other similar concentrates heretofore prepared. The ester concentrates are all bland and pleasant tasting, and remain clear and liquid even at low temperatures of about 0° C. The procedures involved in the practise of this invention can be very expeditiously carried out and require only simple and conventional equipment. The various extractions and separations may be performed with a minimum of difficulty. For instance, the extraction of the semi-concentrate from the partially saponified mass in the process of the present invention is more readily carried out than corresponding extractions from completely saponified masses produced according to earlier processes. Further, the polar solvent extraction and fractionation is greatly facilitated by the removal of the saturated glycerides which further reduces the quantity of oil to be handled.

With the above discussion in mind, there are given hereinafter specific examples of procedures according to the invention, which procedures are to be taken as illustrative only and not in a limiting sense. All parts given are by weight; the vitamin units referred to are the U. S. P. vitamin units.

Example I

Several samples of the same batch of shark liver oil containing 103,000 units of vitamin A per gram (91% of which was in ester form and 9% in alcoholic form) were individually saponified to varying degrees and under varying conditions of catalyst and solvent concentrations and the percentage of vitamin A ester split in each case was determined and recorded. The results are shown graphically in the accompanying drawing, wherein, for each case, the ordinate indicates the percentage of vitamin A remaining in esterified form; the abscissa indicates the total quantity of all esters split, as a chemical-equivalent-percentage of all saponifiable matter present; and the curves 16 to 19 indicate several experiments as follows: Curve 16 represents experiments carried out in the absence of any saponification catalyst; curve 17 represents experiments in which 0.75% of isopropanol saponification catalyst was used, based on weight of the oil treated; curve 18 represents experiments in which 3.00% of isopropanol catalyst was used, based on the weight of the oil treated and curve 19 represents experiments in which 3.00% of isopropanol catalyst was used along with 50% of ethylene dichloride solvent, both based on the weight of the oil treated. It will be seen that in each case the vitamin esters were split to a lesser degree than the other esters present in the oil. From a comparison of the several curves it will be seen that retarding conditions, i. e., the presence of solvent and diminution or omission of catalyst, delay the downward break of the curves, so that a higher degree of saponification of the non-vitamin esters in the oil for any given degree of vitamin ester splitting is possible under these retarding conditions.

Example II 100 parts of shark liver oil containing 99,000 units of vitamin A per gram, 50 parts of ethylene dichloride and 3 parts of isopropanol were mixed, and nitrogen gas bubbled through to deaerate the mixture. 34 parts of 46% KOH (85% of the amount required to completely saponify the oil) were added slowly, with stirring. Stirring was continued for about 20 minutes, after which the thickened mass was insulated against heat loss and allowed to stand for 16 hours. The mass was then heated to 60° C. and stirred for one-half hour, after which it was cooled to 50° C. 400 parts of ethylene dichloride were added to effect partial solution of the mass, after which 13 parts of water were added to increase the water content of the soap-mass to about 24% to cause precipitation of the soap. After cooling the entire mass to room temperature the soap and solvent phases were allowed to separate for 30 minutes, and the latter phase, then drawn off. The soap phase was thereafter extracted seven times with successive 400-part portions of ethylene dichloride, and all of these extracts were combined with the solvent phase originally separated from the saponification mass, filtered, and heated under reduced pressure to drive off the solvent thus leaving a semi-concentrate, hereinafter designated M, having a potency of 466,000 units of vitamin A per gram.

100 parts of the semi-concentrate M prepared as just described were mixed with 400 parts of methanol, and heated to 50° C. to dissolve as much as possible of the semi-concentrate. The mixture was then cooled to −18° C. The supernatant solvent layer, which was entirely free of suspended matter, was decanted from the solidified oil layer. The oil layer, hereinafter denoted N, was treated twice again with 400-part portions of methanol in the same way. The decanted methanol extracts were combined and the methanol removed by vacuum distillation to leave a vitamin concentrate of a potency of 1,250,000 units of vitamin A per gram, largely in the alcoholic form, containing about 49.5% of the vitamin A in the semi-concentrate used. The undissolved residue N from the methanol extraction had a potency of 272,000 units of vitamin A per gram, predominantly in the esterified form, and contained about 50% of the vitamin associated with the semi-concentrate used. This residue was devoid of disagreeable taste and odor, remained clear and fluid at 0° C.

100 parts of a vitamin A ester methanol-insoluble extraction residue N prepared as just described were mixed with 400 parts of isopropanol, and the mixture heated to 41° C. to effect a homogeneous solution. The mixture was then cooled to −18° C. and filtered. The insoluble material O retained on the filter was twice extracted with isopropanol in the same manner as the material N just described. The isopropanol filtrates were combined, and the isopropanol distilled off under reduced pressure in the presence of N₂ gas to leave a vitamin A ester concentrate having a potency of 530,000 units of vitamin A per gram, and containing about 39% of the vitamin A present in the methanol-insoluble residue N employed. The insoluble material O left on the filter by the isopropanol extraction had a potency of 160,000 units of vitamin A per gram, largely in esterified form, and contained about 61% of the vitamin A present in the undissolved methanol extraction residue N employed. Both of these last products were completely devoid of unpleasant taste and odor, and remained clear and liquid at low temperatures.

Example III 100 parts of the semi-concentrate M containing 466,000 units of vitamin A per gram as prepared from shark liver oil in the manner described in Example II and 400 parts of isopropanol were mixed and warmed sufficiently to effect solution. The mixture was then cooled to −18° C. and filtered. The insoluble residue P retained on the filter was twice treated with isopropanol in the same manner as the semi-concentrate M. The isopropanol filtrates were combined and distilled under reduced pressure in the presence of N₂ gas to remove the isopropanol, leaving a concentrate Q having a potency of 1,030,000 units of vitamin A per gram, both in esterified and alcoholic forms, and containing about 71% of the vitamin A in the semi-concentrate M used. The isopropanol-insoluble residue P had a potency of 210,000 units of vitamin A per gram largely in esterfied form and contained 29.0% of the vitamin A in the semi-concentrate M used. Both products remained clear and fluid at about 0° C.

100 parts of an isopropanol-soluble ester-and-alcohol vitamin material Q prepared as just described were mixed with 400 parts of methanol and heated to 50° C. to dissolve as much as possible of the material. The mixture was then cooled to −18° C. The supernatant solvent layer, which was entirely free of suspended matter, was decanted away from the solidified oil layer R. This oil layer R was treated twice again with 400 part portions of methanol in the same way. The decanted methanol extracts were combined and the methanol removed by vacuum distillation to leave a vitamin concentrate of a potency of 1,337,000 units of vitamin A per gram, mostly in alcohol form, containing about 1% of the vitamin A associated with the isopropanol-soluble material Q used. The methanol-insoluble residue R had a potency of 460,000 units of vitamin A per gram, largely in esterified form, and contained about 49% of the vitamin A associated with the isopropanol-soluble material used. This highly-potent ester product was devoid of unpleasant taste and odor and remained clear and fluid in the vicinity of 0° C.

Example IV

A semi-concentrate M containing 466,000 vitamin A units per gram was prepared as described in Example II. 100 parts of the semi-concentrate and 400 parts of methanol were mixed and agitated at room temperature. The agitation was ceased, and the methanol extract layer allowed to separate from the residual oil layer and decanted off. The oil layer was twice again extracted with methanol in the same way at room temperature, and all the decanted methanol extract layers were combined. The methanol was driven off from the combined extracts by vacuum distillation, leaving a residue having a potency of 1,320,000 vitamin A units per gram, largely in alcoholic form, and containing about 52% of the vitamins originally present in the semi-concentrate used. This residue was suitable for use as a highly potent vitamin A alcohol concentrate, and remained clear and fluid at low temperatures. The oil layer insoluble in methanol had a potency of 262,000 vitamin A units per gram, largely in the esterified form, and contained about 48% of the vitamins in the semi-concentrate used. This oil was bland tasting, remained clear and fluid at 0° C.

Example V 100 parts of crude shark liver oil having a potency of 60,000 vitamin A units per gram, 50 parts of ethylene dichloride, and 3 parts of isopropanol were mixed, and nitrogen gas bubbled through the mixture to deaerate the same. 36 parts of 45% KOH (90% of amount required to completely saponify the oil) were added with stirring. Stirring was continued for about 20 minutes, after which the thickened mass was insulated against heat loss and allowed to stand for 16 hours. The mass was then heated to 60° C. and stirred for one-half hour, after which it was cooled to 50° C. 400 parts of ethylene dichloride were mixed in to effect partial solution of the mass, after which 13 parts of water were added to cause precipitation of the soap in the form of granular particles. After cooling to room temperature the soap and solvent phases were allowed to separate for 30 minutes and the latter phase drawn off. The soap-phase was thereafter extracted seven times with successive 400-part portions of ethylene dichloride, and all of these extracts were combined with the solvent phase, removed from the saponified mass, filtered and vacuum distilled to drive off the ethylene dichloride and leave a semi-concentrate having a potency of 282,000 vitamin A units per gram.

100 parts of a semi-concentrate prepared as just described were mixed with 400 parts of methanol, and heated to 50° C. to dissolve as much as possible of the semi-concentrate. The mixture was then cooled to −18° C. The supernatant solvent layer, which was entirely free of suspended matter, was decanted from the solidified oil layer. The oil layer was treated twice again with 400-part portions of methanol in the same way. The decanted methanol extracts were combined, and the methanol removed by vacuum distillation to leave a vitamin concentrate having a potency of 768,000 vitamin A units per gram, largely in the alcoholic form, and containing about 20% of the vitamin A in the semi-concentrate used. The undissolved residue had a potency of 231,000 vitamin A units per gram, largely in the esterified form, and contained about 80% of the vitamin associated with the semi-concentrate used. This residue was devoid of disagreeable taste and odor, remained clear and fluid at low temperatures and was eminently suitable for use as a high potency vitamin A ester concentrate.

*Example VI*

100 parts of crude shark liver oil having a potency of 106,000 vitamin A units per gram, 50 parts of ethylene dichloride, and 3 parts of isopropanol were mixed, and nitrogen gas bubbled through the mixture to deaerate the same. 24 parts of 45% KOH (70% of amount required to completely saponify the oil) were added with stirring. Stirring was continued for about 20 minutes, after which the thickened mass was insulated against heat loss and allowed to stand for 16 hours. The mass was then heated to 60° C. and stirred for one-half hour, after which it was cooled to 50° C. 400 parts of ethylene dichloride were mixed in to effect partial solution of the mass, after which 13 parts of water were added to cause precipitation of the soap in the form of granular particles. After cooling the mass to room temperature the soap and solvent phases were allowed to separate for 30 minutes and the latter phase drawn off. The soap-phase was thereafter extracted seven times with successive 400-part portions of ethylene dichloride, and all of these extracts were combined with the solvent phase and vacuum distilled to drive off the ethylene dichloride and leave a semi-concentrate having a potency of 236,000 vitamin A units per gram.

100 parts of a semi-concentrate prepared as just described were mixed with 400 parts of methanol, and heated to 50° C. to dissolve as much as possible of the semi-concentrate. The mixture was then cooled to −18° C. The supernatant solvent layer, which was entirely free of suspended matter, was decanted away from the solidified oil layer. The oil layer was treated twice again with 400-part portions of methanol in the same way. The decanted methanol extracts were combined, and the methanol removed by vacuum distillation to leave a vitamin concentrate having a potency of 692,000 vitamin A units per gram, largely in the alcoholic form and containing about 17% of the vitamin A in the semiconcentrate used. The undissolved residue had a potency of 206,000 vitamin A units per gram, largely in the esterified form, and contained about 83% of the vitamin associated with the semi-concentrate used. This residue was devoid of disagreeable taste and odor and remained clear and fluid in the vicinity of 0° C.

*Example VII*

100 parts of crude shark liver oil having a potency of 23,900 vitamin A units per gram, 50 parts of ethylene dichloride and 3 parts of isopropanol were mixed and nitrogen gas bubbled through the mixture to deaerate it. 28 parts of 45% KOH (95% of the amount required to completely saponify the oil) were added slowly with stirring. Stirring was continued for about 20 minutes, after which the thickened mass was insulated against heat loss and allowed to stand for 16 hours. The mass was then heated to 60° C. and stirred for one-half hour, after which it was cooled to 50° C. 400 parts of ethylene dichloride were mixed in to effect partial solution of the mass after which 13 parts of water were added to cause precipitation of the soap in the form of granular particles. After cooling the mass to room temperature the soap and solvent phases were allowed to separate for 30 minutes, and the latter phase then drawn off. The soap-phase was thereafter extracted seven times with successive 400-part portions of ethylene dichloride, and all of these extracts were combined with the solvent phase, filtered, and heated under reduced pressure to drive off the solvent and leave a semi-concentrate having a potency of 264,000 units of vitamin A per gram.

100 parts of semi-concentrate prepared as just described were mixed with 400 parts of methanol, and heated to 50° C. to dissolve as much as possible of the semi-concentrate. The mixture was then cooled to −18° C. The supernatant solvent layer, which was entirely free of suspended matter, was decanted away from the solidified oil layer. The oil layer was treated twice again with 400-part portions of methanol in the same way. The decanted methanol extracts were combined and the methanol removed by vacuum distillation to leave a vitamin concentrate having a potency of 610,000 vitamin A units per gram, largely in the alcoholic form, and containing about 48% of the vitamin A in the semi-concentrate used. The undissolved residue had a potency of 168,500 units of vitamin A per gram, largely in the esterified form, and contained about 52% of the vitamin associated with the semi-concentrate used. This residue was devoid of disagreeable taste and odor, remained clear and fluid at low temperatures, i. e. about 0° C.

*Example VIII*

200 parts of crude shark liver oil containing 103,000 units of vitamin A per gram, were mixed with 1.5 parts of isopropanol while bubbling nitrogen gas into the mixture. 58 parts of aqueous 45% potassium hydroxide (75% of the amount theoretically required to saponify all the saponifiable matter in the oil) were added, and the mixture stirred for 30 minutes. The semi-solid saponification mass was then insulated against temperature change and left quiescent for 12 hours. Thereafter the mass was heated to 60° C. while stirring in the presence of nitrogen gas for 15 minutes. 800 parts of ethylene dichloride were added, and the mixture thoroughly agitated. Sufficient water was then added to the mass to increase the moisture content of the soap phase therein to about 24% and the solvent-soap mass cooled to about 25° C. After allowing the mass to stand at this temperature for 30 minutes, the clear solvent layer was drawn off. The soap mass was again extracted by adding 800 parts of ethylene dichloride thereto, agitating the mass for 15 minutes, allowing the ethylene dichloride to settle to the bottom, and drawing off the ethylene dichloride. This extraction was repeated 6 times more. All the ethylene dichloride solutions removed from the saponification mass were combined and filtered, and then evaporated under reduced pressure to remove ethylene dichloride, leaving a semi-concentrate of the vitamins containing 338,000 vitamin A units per gram.

This semi-concentrate was then extracted with 3 successive 400-part portions of methanol at −18° C., the methanol extracts were combined and the methanol evaporated off under reduced pressure to leave a concentrate having a potency of 388,000 units of vitamin A per gram, largely in the form of alcoholic vitamin, and containing about 14% of the vitamins present in the semi-concentrate used.

The unextracted residue from the methanol treatment had a potency of 332,000 units of vitamin A per gram, largely in esterified form, and contained about 86% of the vitamin A present in the semi-concentrate. This vitamin A ester product was light in color and substantially devoid of taste and odor.

Example IX 200 parts of shark liver oil containing 100,000 units of vitamin A per gram were mixed with 6 parts of 99% isopropanol and the mixture stirred for 5 minutes in the presence of $N_2$ gas in order to remove any entrapped air. Sufficient 45% aqueous KOH (63.5 parts) to saponify about 80% of the oil was added and the mixture stirred at a medium rate for about 7 minutes. The temperature at this point was 49° C. The stirring was discontinued and the mass insulated and allowed to stand for 12 hours. 800 parts of ethylene dichloride were added and the mixture heated, while stirring slowly, to about 60° C. Sufficient water was added to raise the moisture content to about 25% and the mixture then cooled to about 27° C. Stirring was discontinued and the mass allowed to stand for 15 minutes. The lower clear solvent layer was removed and another fresh batch of solvent added, stirred into the saponified mass, separated, and removed. In this manner a total of eight extractions were made. The combined solvent extracts were filtered and the solvent evaporated off under reduced pressure and in the presence of $N_2$ gas, leaving a semi-concentrate having a potency of 447,000 units of vitamin A per gram.

100 parts of the semi-concentrate prepared as above described were mixed with 400 parts of 95% ethanol and the mixture warmed to about 50° C. while agitating in the presence of $N_2$ gas. The mixture was then cooled to —18° C. and filtered. The insoluble oily layer was extracted twice more in the same manner with 400-part portions of ethanol. The combined ethanol extracts were evaporated to drive off the ethanol. The extracted ethanol-soluble oil contained 460,000 units vitamin A per gram, largely in the form of vitamin A alcohol. The ethanol-insoluble oil was also evaporated to remove entrained ethanol. This fraction contained 416,000 units of vitamin A per gram, largely in the form of vitamin A ester. About 70% of the vitamin A present in the semi-concentrate was in the esterified form, whereas about 30% of the vitamin A was present in the alcohol form.

Example X 400 parts of greyfish liver oil containing 25,000 units of vitamin A per gram were stirred for 10 minutes in the presence of $N_2$ gas at 28° C. in order to remove any entrapped air. Sufficient 45% aqueous KOH (155.5 parts) to saponify about 95% of the oil was added and the mixture stirred while bubbling $N_2$ gas into the mixture for 65 minutes, during which time the temperature increased from 28° C. to about 55° C. The soap mass was treated further essentially as described in Example VIII. The resultant semi-concentrate contained 419,000 units of vitamin A per gram.

100 parts of the semi-concentrate prepared as just described were extracted three times with 400-part portions of methanol. The extracted methanol-soluble oil contained 448,000 units of vitamin A per gram, largely in the form of vitamin A alcohol. The methanol-insoluble oil fraction contained 340,000 units of vitamin A per gram, largely in the form of vitamin A ester. About 43% of the vitamin A in semi-concentrate was present as the ester while 57% was in the alcohol form.

It will be evident from the foregoing description and examples that there is provided by this invention a process whereby unusually potent concentrates of the vitamins in their several forms may be obtained; whereby the development of the usual bitter "concentrate" taste is substantially avoided; and whereby the concentrates may be obtained in high yield and with a minimum of handling difficulties.

While the only specific method of effecting saponification (hydrolysis) of the esters contained in marine oils has involved the use of an alkaline agent, other methods to effect splitting of the esters may be employed within the purview of this invention and particularly enzyme saponification (hydrolysis).

Since certain changes in carrying out the above process and certain modifications in the composition which embody the invention may be made without departing from its scope, it is intended that all matter contained in the above description shall be interpreted as illustrative and not in a limiting sense.

Having described my invention, what I claim as new and desire to secure by Letters Patent is:

1. A process of producing fat-soluble vitamin concentrates, one rich in vitamin esters and one rich in vitamin alcohols, which comprises saponifying from 60% to 95% of the saponifiable content of a fat-soluble vitamin-containing marine oil, extracting the resulting saponaceous mass with a water-immiscible solvent which will not dissolve the soap to recover the unsaponified fraction containing vitamin alcohols and vitamin esters, extracting said unsaponified fraction with a highly polar selective solvent which is characterized by being miscible with the vitamin alcohols but immiscible with the vitamin esters to recover a concentrate rich in vitamin alcohols, the residue being rich in vitamin esters, contacting the residue rich in vitamin esters with an organic aliphatic polar solvent characterized by being miscible with said residue at temperatures substantially above room temperature and partially immiscible therewith at temperatures below room temperature, cooling the mass to cause layer formations and separating the solvent layer containing the extracted vitamin esters from the solvent-insoluble portion of said residue.

2. A process of producing fat-soluble vitamin concentrates, one rich in vitamin esters and one rich in vitamin alcohols, which comprises saponifying from 60% to 95% of the saponifiable content of a fat-soluble vitamin-containing marine oil, extracting the resulting saponaceous mass with a water-immiscible solvent which will not dissolve the soap to recover the unsaponified fraction containing vitamin alcohols and vitamin esters, extracting said unsaponified fraction with methanol to recover a concentrate rich in vitamin alcohols, the residue being rich in vitamin esters, contacting the residue rich in vitamin esters with an organic aliphatic polar solvent characterized by being miscible with said residue at temperatures substantially above room temperature and partially immiscible therewith at temperatures below room temperature, cooling the mass to cause layer formations and separating the solvent layer containing the extracted vitamin esters from the solvent-insoluble portion of said residue.

3. A process of producing fat-soluble vitamin concentrates, one rich in vitamin esters and one rich in vitamin alcohols, which comprises saponifying from 60% to 95% of the saponifiable content of a fat-soluble vitamin-containing marine oil, extracting the resulting saponaceous mass with a water-immiscible solvent which will not dissolve the soap to recover the unsaponified fraction containing vitamin alcohols and vitamin esters, extracting said unsaponified fraction with methanol to recover a concentrate rich in vitamin alcohols, the residue being rich in vitamin esters, contacting the residue rich in vitamin esters with isopropanol, cooling the mass to cause layer formations and separating the isopropanol layer containing the extracted vitamin esters from the isopropanol-insoluble portion of said residue.

4. A process of producing fat-soluble vitamin concentrates, one rich in vitamin esters and one rich in vitamin alcohols, which comprises saponifying from 60% to 95% of the saponifiable content of shark liver oil, extracting the resulting saponaceous mass with a water-immiscible solvent which will not dissolve the soap to recover the unsaponified fraction containing vitamin alcohols and vitamin esters, extracting said unsaponified fraction with methanol to recover a concentrate rich in vitamin alcohols, the residue being rich in vitamin esters, contacting the residue rich in vitamin esters with isopropanol, cooling the mass to cause layer formations and separating the isopropanol layer containing the extracted vitamin esters from the isopropanol-insoluble portion of said residue.

5. A process of producing fat-soluble vitamin concentrates, one rich in vitamin esters and one rich in vitamin alcohols, which comprises saponifying from 60% to 95% of the saponifiable content of tuna liver oil, extracting the resulting saponaceous mass with a water-immiscible solvent which will not dissolve the soap to recover the unsaponified fraction containing vitamin alcohols and vitamin esters, extracting said unsaponified fraction with methanol to recover a concentrate rich in vitamin alcohols, the residue being rich in vitamin esters, contacting the residue rich in vitamin esters with isopropanol, cooling the mass to cause layer formations and separating the isopropanol layer containing the extracted vitamin esters from the isopropanol-insoluble portion of said residue.

6. A process of producing fat-soluble vitamin concentrates, one rich in vitamin esters and one rich in vitamin alcohols, which comprises saponifying from 60% to 95% of the saponifiable content of halibut liver oil, extracting the resulting saponaceous mass with a water-immiscible solvent which will not dissolve the soap to recover the unsaponified fraction containing vitamin alcohols and vitamin esters, extracting said unsaponified fraction with methanol to recover a concentrate rich in vitamin alcohols, the residue being rich in vitamin esters, contacting the residue rich in vitamin esters with isopropanol, cooling the mass to cause layer formations and separating the isopropanol layer containing the extracted vitamin esters from the isopropanol-insoluble portion of said residue.

LORAN O. BUXTON.